United States Patent
Chen et al.

(10) Patent No.: US 10,231,205 B2
(45) Date of Patent: Mar. 12, 2019

(54) METHOD FOR SENDING AN IN-BAND POSITIONING SIGNAL AND IN-BAND POSITIONING SYSTEM IN COMMUNICATION NETWORK

(71) Applicant: ZTE Corporation, Shenzhen (CN)

(72) Inventors: Shijun Chen, Shenzhen (CN); Liujun Hu, Shenzhen (CN); Guanghui Yu, Shenzhen (CN); Bo Dai, Shenzhen (CN); Zhaohua Lu, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 0 days.

(21) Appl. No.: 15/523,454

(22) PCT Filed: Jan. 14, 2015

(86) PCT No.: PCT/CN2015/070711
§ 371 (c)(1),
(2) Date: May 1, 2017

(87) PCT Pub. No.: WO2015/184807
PCT Pub. Date: Dec. 10, 2015

(65) Prior Publication Data
US 2017/0318553 A1    Nov. 2, 2017

(30) Foreign Application Priority Data
Oct. 29, 2014  (CN) .......................... 2014 1 0596962

(51) Int. Cl.
*H04W 24/00* (2009.01)
*H04W 64/00* (2009.01)
(Continued)

(52) U.S. Cl.
CPC ............. *H04W 64/00* (2013.01); *G01S 1/042* (2013.01); *G01S 5/0045* (2013.01);
(Continued)

(58) Field of Classification Search
CPC ..... H04W 64/00; G01S 5/0236; G01S 5/0045
(Continued)

(56) References Cited

U.S. PATENT DOCUMENTS

| | | | | |
|---|---|---|---|---|
| 2009/0009662 A1* | 1/2009 | Manapragada | ........... | H04L 7/08 348/537 |
| 2009/0232189 A1* | 9/2009 | Junell | .................... | H04B 1/713 375/137 |

FOREIGN PATENT DOCUMENTS

| | | |
|---|---|---|
| CN | 1622650 A | 6/2005 |
| CN | 102265687 A | 11/2011 |
| CN | 103026253 A | 4/2013 |

OTHER PUBLICATIONS

International Search Report for corresponding application No. PCT/CN2015/070711 filed on Jan. 14, 2015; dated Jul. 29, 2015.

* cited by examiner

*Primary Examiner* — Marcos Batista
(74) *Attorney, Agent, or Firm* — Cantor Colburn LLP

(57) ABSTRACT

Provided is a method for sending an in-band positioning signal and in-band positioning system in a communication network. The system includes: a Position Management Station (PMS), arranged to manage one or more Position Service Stations (PSSs) and provide a synchronization reference clock for the one or more PSSs; a positioning center network element, arranged to provide position estimation information for a terminal based on position information of the one or more PSSs and send the position estimation information to the terminal; and the one or more PSSs, of which each PSS uses a same frequency band used by the communication network and is arranged to generate an in-band positioning signal for measuring a distance, regulate a sending clock of the in-band positioning signal according to a difference value between a local sending clock and the synchronization reference clock and send the in-band positioning signal to the terminal.

20 Claims, 7 Drawing Sheets

(51) Int. Cl.
*G01S 5/00* (2006.01)
*G01S 5/02* (2010.01)
*G01S 1/04* (2006.01)
*H04W 56/00* (2009.01)

(52) U.S. Cl.
CPC .......... *G01S 5/0226* (2013.01); *G01S 5/0236* (2013.01); *H04W 56/00* (2013.01)

(58) Field of Classification Search
USPC ........................................ 455/456.1; 370/338
See application file for complete search history.

METHOD FOR SENDING AN IN-BAND POSITIONING SIGNAL AND IN-BAND POSITIONING SYSTEM IN COMMUNICATION NETWORK

TECHNICAL FIELD

The present disclosure relates to the field of communications, and more particularly to a method for sending an in-band positioning signal and in-band positioning system in a communication network.

BACKGROUND

Along with continuous development of times, positioning technology attracts more and more attentions, and an indoor scenario and the like with a high-accuracy positioning requirement, particularly a requirement of meter-level positioning accuracy, makes a higher technical requirement on wireless positioning.

For Global Position System (GPS) positioning technology, because of signal loss and the like, an indoor signal becomes weak, which makes a positioning terminal not find sufficient satellites. For a cellular network system, because of a great positioning error, sufficient accuracy may not be achieved no matter outdoors or indoors, and a wireless positioning requirement may not be met.

In order to solve an indoor high-accuracy positioning problem, it is necessary to establish a wireless positioning system on the ground. Ground proximity arrangement is adopted for each positioning signal station of the ground wireless positioning system. There are multiple manners for establishing a ground wireless positioning network, including a ground pseudo-satellite system adopting a satellite-system, a wireless local area network system and the like. The ground pseudo-satellite system requires a mobile phone to process a situation in which ground satellite and space satellite signals coexist, and a very high requirement is proposed on a dynamic range for the mobile phone. A wireless local area network mainly adopts a signal-strength-based distance measurement method; positioning accuracy greatly depends on an arranged network density, and a very high requirement is proposed on positioning network costs.

A communication network has good coverage. However, a current communication network is mainly oriented to a communication requirement, and less research on a positioning requirement is made, so that a positioning error of a communication network ranges from hundreds of meters to thousands of meters, which fails to meet indoor and outdoor positioning requirements. The communication network in the field of positioning is at an edge position. Increasing the density of a communication network to improve positioning accuracy may cause relatively higher network construction costs, and also increase network interference.

At present, a network architecture supporting positioning in a Long-Term Evolution (LTE) system is shown in FIG. 1. As shown in FIG. 1, it can be seen that positioning may be performed only in a scenario where base stations (which are also called as Evolved Node Bs (eNodeBs) are arranged in the figure, and improving positioning performance of a wireless positioning system requires to increase an arrangement density of the base stations, particularly in places where communication requirements have been met, which makes construction costs and arrangement costs undoubtedly increased, for example, electricity consumption and the like are increased. In addition, an interface between current standard eNodeBs may not support high-accuracy synchronization.

The solution discusses an equipment structure and signal sending method for implementing wireless positioning on the basis of a communication network. The present patent mainly proposes a novel in-band Position Service Station (PSS) device and a positioning signal sending method, which can remarkably enhance wireless positioning accuracy of an current communication network and implement seamless integration of the communication network and a positioning network.

For the abovementioned problem in the related art, there is yet no effective solution.

SUMMARY

The present disclosure provides a method for sending an in-band positioning signal and in-band positioning system in a communication network, so as to at least solve one of the abovementioned problems.

According to an embodiment of the present disclosure, an in-band positioning system in a communication network is provided, which may include: a Position Management Station (PMS), located in the communication network arranged to manage one or more PSSs and provide a synchronization reference clock for the one or more PSSs; a positioning center network element, located in the communication network and arranged to provide position estimation information for a terminal based on position information of the one or more PSSs and send the position estimation information to the terminal; and the one or more PSSs, of which each PSS uses a same frequency band used by the communication network and is arranged to generate, according to positioning signal auxiliary information, an in-band positioning signal for measuring a distance, regulate a sending clock of the in-band positioning signal according to a difference value between a local sending clock and the synchronization reference clock provided by the PMS and send the in-band positioning signal to the terminal according to the regulated sending clock.

In an exemplary example, the PMS and the PSS are deployed in the communication network in one of the following forms: a first form in which the PMS and the PSS are located in a same device; a second form in which the PMS and the PSS are two separate and independent devices; and a third form in which the first form and the second form coexist.

In an exemplary example, the PSS sends the in-band positioning signal in one of the following manners, when the PSS and the PMS are located in the same device, the PSS sends a communication signal and the in-band positioning signal together through a resource used for the communication signal of the PMS; when the PSS and the PMS are two separate and independent devices, the PSS sends the in-band positioning signal and a specified wireless signal together; and the PSS sends the in-band positioning signal only.

In an exemplary example, the PMS is located in an eNodeB, or the PMS and an eNodeB are separately arranged.

In an exemplary example, in an LTE system, the positioning center network element is an Evolved Serving Mobile Location Center (E-SMLC).

In an exemplary example, the PSS includes: a communication component, arranged to implement communication between the PSS and other equipment excluding the PSS; a management component, arranged to acquire, from the PMS, a cell Identifier (ID) or a PSS ID used for uniquely identifying the PSS, and acquire synchronization auxiliary information required by a synchronization component and the positioning signal auxiliary information; a storage component, arranged to store an equipment number of the PSS, wherein an equipment number of each PSS is unique; the synchronization component, arranged to measure a clock difference between a local clock and a reference node; and a positioning signal sending component, arranged to regulate the local sending clock according to the cell ID of the PMS or the PSS ID, and the clock difference obtained by the synchronization component, generate the in-band positioning signal and send the in-band positioning signal to the terminal.

In an exemplary example, the management component is arranged to acquire the cell ID or the PSS ID in one of the following manners in which the management component is arranged to, when the PMS manages multiple PSSs and the PSS ID is not a globally uniformly allocated ID, report the equipment number of the PSS to the PMS through the communication component, and the PMS locally acquires the PSS ID and the cell ID of the PMS according to the equipment number; and the management component is arranged to, when the one or more PSSs correspond to one or more cells one to one, or the PSS and the PMS are located in the same device, report the equipment number of the PSS through the communication component, and the PMS acquires a cell ID of a cell where the PMS is located according to the equipment number.

In an exemplary example, when the PMS is located in an eNodeB, the cell ID of the PMS is a cell ID of the eNodeB; or when the PMS and the eNodeB are separately arranged, a cell ID is allocated to the PMS.

In an exemplary example, the positioning signal auxiliary information includes at least one of a frequency-domain resource position of a positioning signal, time-domain resource position of a positioning signal, and length of a positioning signal.

In an exemplary example, the management component is arranged to acquire the positioning signal auxiliary information in one of the following manners in which the positioning signal auxiliary information is acquired from the PMS; and the positioning signal auxiliary information is acquired from preset configuration information.

In an exemplary example, the synchronization auxiliary information includes one of a sending time point of measurement information of the clock difference and address information of an auxiliary site, wherein the auxiliary site is a node on a visual path tree between the PSS and the PMS.

In an exemplary example, the PSS ID is acquired in one of the following manners in which the equipment number is allocated to the PSS, wherein equipment numbers allocated to each PSS are different, and the allocated equipment number is determined as the PSS ID; an identification number used for uniquely identifying the PSS is identified by adopting a preset format, and determining the identification number as the PSS ID.

In an exemplary example, the synchronization component acquires the clock difference in the following manner in which the synchronization component performs synchronization message interaction with an auxiliary site to acquire the clock difference according to the synchronization auxiliary information acquired by the management component.

In an exemplary example, the PSS sends the in-band positioning signal to the terminal through a first communication interface, wherein the first communication interface is a dedicated interface for sending the in-band positioning signal; and/or the PMS communicates with the PSS through a second communication interface, wherein the second communication interface is a dedicated interface for managing the PSS by the PMS and providing synchronization information and the positioning signal auxiliary information for the PSS; and/or the PMS communicates with the positioning center network element through a third communication interface, wherein the third communication interface is a dedicated interface for transmitting auxiliary information required by position estimation or the position estimation information.

In an exemplary example, the PMS is in a wired connection or a wireless connection with the PSS.

In an exemplary example, when the PMS is in the wireless connection with the PSS, the PSS has a visual path with at least one PSS managed by the PMS.

In an exemplary example, the in-band positioning signal includes: a positioning pilot signal.

In an exemplary example, the positioning pilot signal is determined in one of the following manners: a first manner in which a positioning pilot signal sequence of the PSS in LTE is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

and $$c_{init} = 2^{10} \cdot (7 \cdot (n_s + 1) + l + 1) \cdot (2 \cdot N_{ID}^{cell} + 1 + k \cdot PSSID) + 2 \cdot N_{ID}^{cell} + k \cdot PSSID + N_{CP},$$

where $N_{ID}^{cell}$ is a cell Identifier (ID) of the PMS; PSSID is a PSS ID; k is a natural number arranged by the system; $n_S$ is a timeslot number; l is a symbol number of Orthogonal Frequency Division Multiplexing (OFDM) in a timeslot; $N_{RB}^{max,DL}$ equal to an allocated resource length; m is a variable; c(i) is a pseudo-random sequence; $C_{init}$ is an initial value of a function c(x), and $N_{CP}$ is:

$$N_{CP} = \begin{cases} 1 & \text{normal } CP \\ 0 & \text{extended } CP \end{cases};$$

and a send manner in which, when one or more cells correspond to the one or more PSSs one to one and a specified device in the one or more cells is determined as a PSS, the positioning pilot signal sequence is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

and $$c_{init} = 2^{10} \cdot (7 \cdot (n_s + 1) + l + 1) \cdot (2 \cdot CELLID + 1) + 2 \cdot CELLID + N_{CP},$$

where CELLID is a cell ID; $n_S$ is a timeslot number; l is a symbol number of OFDM in a timeslot; $N_{RB}^{max,DL}$ is equal to a allocated resource length; m is a variable; c(i) is a pseudo-random sequence, and is initialized to be $c_{init}$; and $N_{CP}$ is:

$$N_{CP} = \begin{cases} 1 & \text{normal } CP \\ 0 & \text{extended } CP \end{cases}.$$

In an exemplary example, a length of the in-band positioning signal matches a resource length in the positioning signal auxiliary information; and/or, different in-band positioning signals meet orthogonality with each other; and/or, time of a positioning signal meets orthogonality after shifted by an integral multiple of a standard sampling point period.

In an exemplary example, the standard sampling point period is a time interval between sampling points corresponding to a sampling frequency meeting baseband signal processing.

In an exemplary example, the PSS regulates the sending clock of the in-band positioning signal in one of the following manners in which the local sending clock is regulated to make a clock pulse time point of the local sending clock consistent with the synchronization reference clock; and a sending time point of the in-band positioning signal is regulated and the difference value is added to a local clock pulse time point to obtain a time point as the sending time point of the in-band positioning signal.

According to another embodiment of the present disclosure, a method for sending an in-band positioning signal in a communication network is further provided, which may include that: a PSS in the communication network acquires a difference value between a local clock and a synchronization reference clock, and auxiliary information required by position estimation or position estimation information; the PSS generates an in-band positioning signal according to the auxiliary information required by the position estimation or the position estimation information; and the PSS regulates a sending clock of the in-band positioning signal according to the difference value, and the PSS sends the in-band positioning signal according to the regulated sending clock.

In an exemplary example, a length of the in-band positioning signal matches a resource length in positioning signal auxiliary information; and/or, different in-band positioning signals meet orthogonality with each other; and/or, time of a positioning signal meets orthogonality after shifted by an integral multiple of a standard sampling point period.

In an exemplary example, the standard sampling point period is a time interval between sampling points corresponding to a sampling frequency meeting baseband signal processing.

In an exemplary example, the PSS regulates the sending clock of the in-band positioning signal in one of the following manners in which a local sending clock Is regulated to make a clock pulse time point of the local sending clock consistent with the synchronization reference clock; and a sending time point of the in-band positioning signal is regulated and the difference value is added to a local clock pulse time point to obtain a time point as the sending time point of the in-band positioning signal.

According to the present disclosure, a PMS is located in the communication network and is arranged to manage one or more PSSs and provide a synchronization reference clock for the one or more PSSs; a positioning center network element is located in the communication network and arranged to provide position estimation information for a terminal based on position information of the one or more PSSs and send the position estimation information to the terminal; and the one or more PSSs, of which each PSS uses a same frequency band used by the communication network and is arranged to generate, according to positioning signal auxiliary information, an in-band positioning signal for measuring a distance, regulate a sending clock of the in-band positioning signal according to a difference value between a local sending clock and the synchronization reference clock provided by the PMS and send the in-band positioning signal to the terminal according to the regulated sending clock. A contradiction between positioning accuracy and costs in the current communication network is solved, meanwhile, a high-accuracy clock synchronization mechanism is provided, and the conventional problems of low positioning accuracy and high arrangement costs in the communication network are solved, thereby achieving the effects of improving the positioning accuracy of the communication network with low cost and seamlessly integrating the communication network and positioning.

BRIEF DESCRIPTION OF THE DRAWINGS

The drawings described herein are adopted to provide a further understanding to the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below in detail with reference to the drawings and embodiments. It is important to note that the embodiments in the present disclosure and characteristics in the embodiments may be combined under the condition of no conflicts.

Figure 1:
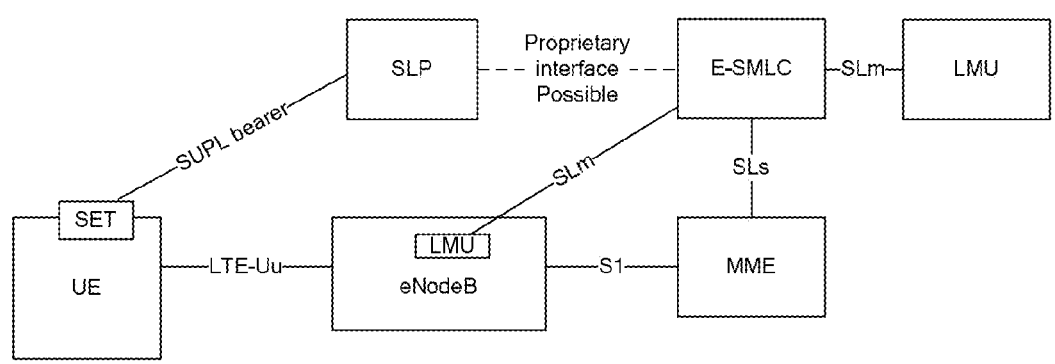
FIG. 1 is a schematic diagram of a network architecture supporting positioning in an LTE according to the related art.
Figure 2:
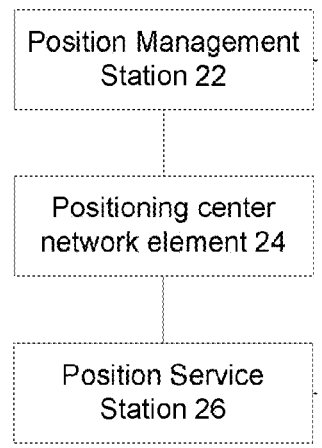
FIG. 2 is a structure diagram of an in-band positioning system in a communication network according to an embodiment of the present disclosure.

The embodiments provide an in-band positioning system in a communication network. FIG. 2 is a structure diagram of an in-band positioning system in a communication network according to an embodiment of the present disclosure. As shown in FIG. 2, the system includes: a PMS 22, located in the communication network and arranged to manage one or more PSSs and provide a synchronization reference clock for the one or more PSSs; a positioning center network element 24, located in the communication network and arranged to provide position estimation information for a terminal based on position information of the one or more PSSs and send the position estimation information to the terminal, wherein, in an exemplary embodiment, the position estimation information may be presented as a position estimation result, and may also be presented as information required by position estimation; and the one or more PSSs 26, of which each PSS uses the same frequency band used by the communication network and is arranged to generate, according to positioning signal auxiliary information, an in-band positioning signal for measuring a distance, regulate a sending clock of the in-band positioning signal according to a difference value between a local sending clock and the synchronization reference clock provided by the PMS 22 and send the in-band positioning signal to the terminal according to the regulated sending clock. In an exemplary embodiment, the positioning signal auxiliary information acquired by the PMS 22 may refer to information required for generating the positioning signal.

By the in-band positioning system in the communication network, a contradiction between positioning accuracy and costs in the current communication network is solved, meanwhile, a high-accuracy clock synchronization mechanism is provided, and the conventional problems of low positioning accuracy and high arrangement costs in the communication network are solved, thereby achieving the effects of improving the positioning accuracy of the communication network with low cost and seamlessly integrating the communication network and positioning are further achieved.

Figure 3A:
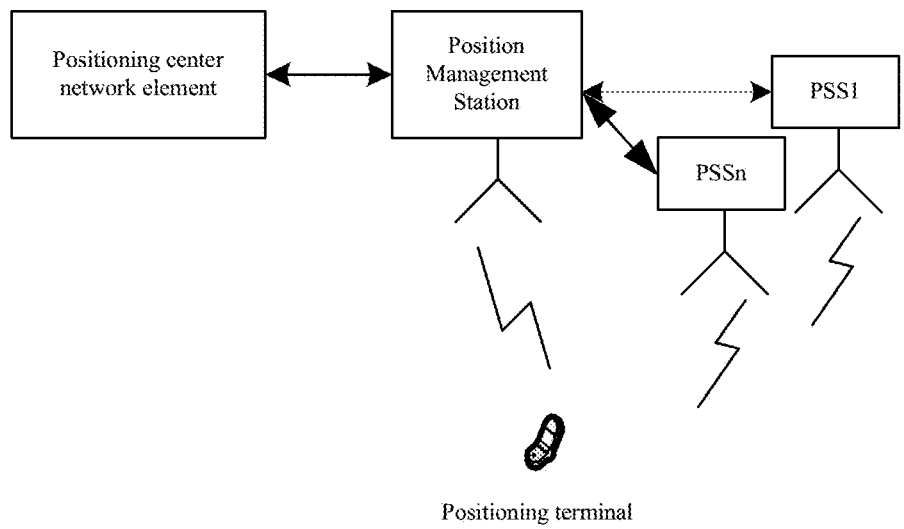
FIG. 3a is a first network architecture diagram after an in-band PSS is added on the basis of a communication network according to an embodiment of the present disclosure.

In an exemplary embodiment, a network architecture of the in-band positioning system of the communication network in the communication network may refer to FIG. 3a, and the network architecture in FIG. 3a includes: a positioning center network element, a PMS and multiple PSSs (PSS1, . . . , PSSn).

Figure 3B:
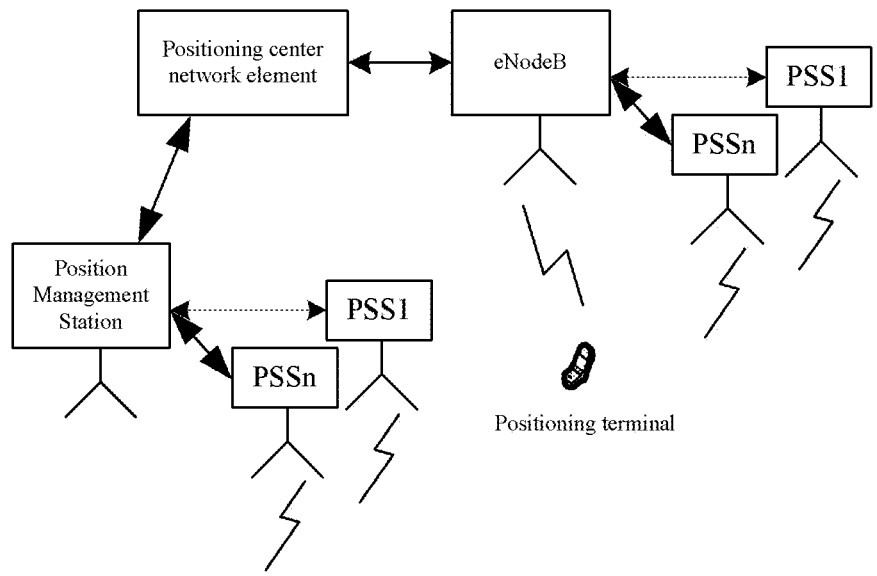
FIG. 3b is a second network architecture diagram after an in-band PSS is added on the basis of a communication network according to an embodiment of the present disclosure.

Multiple forms may be adopted for the PMS 22 and the PSS 26. In an exemplary embodiment, in the communication network, the PMS 22 and the PSS 26 are deployed in one of the following forms: a first form in which the PMS 22 and the PSS 26 are located in a same device; a second form in which the PMS 22 and the PSS 26 are two separate and independent devices; and a third form in which the first form and the second form coexist, that is, in the communication network, the first form and the second form may coexist. In an exemplary embodiment, a network architecture in the third form may refer to FIG. 3b.

It is important to note that the PSS 26 may send the in-band positioning signal in multiple manners, which will be described below with an example. In an exemplary embodiment, the PSS 26 sends the in-band positioning signal in one of the following manners. When the PSS 26 and the PMS 22 are located in the same device, the PSS 26 sends a communication signal and the in-band positioning signal together through a resource used for the communication signal of the PMS. When the PSS 26 and the PMS 22 are two separate and independent devices, the PSS 26 sends the in-band positioning signal and a specified wireless signal together; and the PSS 26 only sends the in-band positioning signal.

In an exemplary embodiment, there may also be multiple position management manners for the PMS 22 and an eNodeB. In an exemplary embodiment, the PMS 22 may be located in the eNodeB, or the PMS 22 and an eNodeB are separately arranged.

In another exemplary embodiment, in an LTE system, the positioning center network element 24 is an E-SMLC.

Figure 4A:
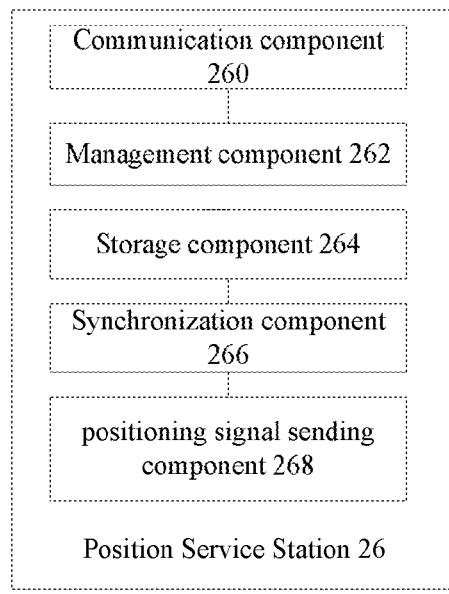
FIG. 4a is a structure diagram of a PSS according to an embodiment of the present disclosure.

FIG. 4a is a structure diagram of a PSS according to an embodiment of the present disclosure. As shown in FIG. 4a, the PSS 26 includes a communication component 260, arranged to implement communication between the PSS 26 and other equipment excluding the PSS 26; a management component 262, arranged to acquire, from the PMS 22, a cell ID or a PSS ID used for uniquely identifying the PSS 26, and acquire synchronization auxiliary information required by a synchronization component and the positioning signal auxiliary information; a storage component 264, arranged to store an equipment number of the PSS 26, wherein an equipment number of each PSS is unique; the synchronization component 266, arranged to measure a clock difference between a local clock and a reference node; and a positioning signal sending component 268, arranged to regulate the local sending clock according to the cell ID of the PMS 22 or the PSS ID and the clock difference obtained by the synchronization component 266, generate the in-band positioning signal and send the in-band positioning signal to the terminal.

Figure 4B:
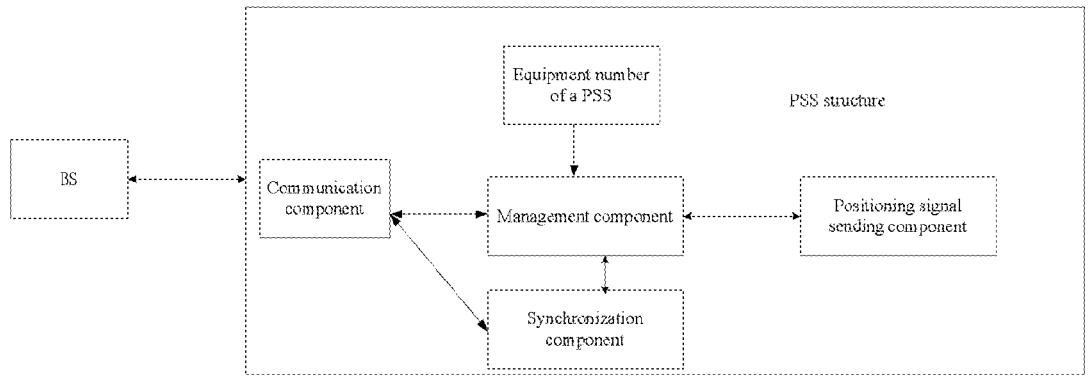
FIG. 4b is another structure diagram of a PSS according to an embodiment of the present disclosure.

In an exemplary embodiment, a relationship between the PSS 26 and the eNodeB may refer to FIG. 4b.

In an exemplary embodiment, the management component 262 is arranged to acquire the cell ID or the PSS ID in one of the following manners. In one manner, the management component 262 is arranged to, when the PMS 22 manages multiple PSSs and the PSS ID is not a globally uniformly allocated ID, report the equipment number of the PSS 26 to the PMS 22 through the communication component 260, and the PMS 22 locally acquires the PSS ID and the cell ID of the PMS 22 according to the equipment number.

In another manner, the management component 262 is arranged to, when the one or more PSSs 26 correspond to one or more cells one to one or the PSS 26 and the PMS 22 are located in the same device, report the equipment number of the PSS 26 through the communication component, and the PMS 22 acquires a cell ID of a cell where the PMS is located according to the equipment number.

When the PMS 22 is located in an eNodeB, the cell ID of the PMS 22 is a cell ID of the eNodeB; or when the PMS 22 and the eNodeB are separately arranged, a cell ID is allocated to the PMS 22.

In an exemplary embodiment, the positioning signal auxiliary information includes at least one of a frequency-domain resource position of a positioning signal, time-domain resource position of a positioning signal and length of a positioning signal.

The management component 262 is arranged to acquire the positioning signal auxiliary information in one of the following manners. In one manner, the positioning signal auxiliary information is acquired from the PMS 22; in another manner, the positioning signal auxiliary information is acquired from preset configuration information.

The synchronization auxiliary information includes one of a sending time point of measurement information of the clock difference and address information of an auxiliary site, wherein the auxiliary site is a node on a visual path tree between the PSS and the PMS.

The PSS ID is acquired in one of the following manners. In one manner, the equipment number is allocated to the PSS, wherein equipment numbers allocated to each PSS are different, and the allocated equipment number is determined as the PSS ID; in another manner, an identification number used for uniquely identifying the PSS is defined by adopting a preset format, and the identification number is determined as the PSS ID.

The synchronization component 266 acquires the clock difference in the following manner in which the synchronization component 266 performs synchronization message interaction with an auxiliary site to acquire the clock difference according to the synchronization auxiliary information acquired by the management component 262.

Figure 3C:
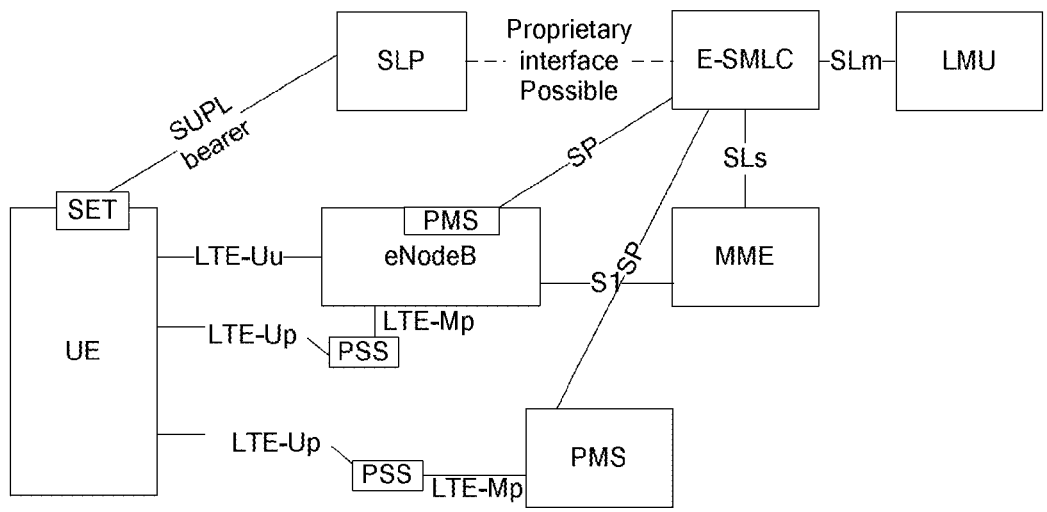
FIG. 3c is a third network architecture diagram after an in-band PSS is added on the basis of a communication network according to an embodiment of the present disclosure.

In an exemplary embodiment, the PSS 26 sends the in-band positioning signal to the terminal through a first communication interface, wherein the first communication interface is a dedicated interface for sending the in-band positioning signal; and/or, the PMS 22 communicates with the PSS 26 through a second communication interface, wherein the second communication interface is a dedicated interface for managing the PSS 26 by the PMS 22 and providing synchronization information and the positioning signal auxiliary information for the PSS 26; and/or, the PMS 22 communicates with the positioning center network element 24 through a third communication interface, wherein the third communication interface is a dedicated interface for transmitting auxiliary information required by position estimation or the position estimation information. In another exemplary embodiment, the name of the first communication interface may be an LTE-Up interface; and/or the name of the second communication interface may be an LTE-Mp interface; and/or the name of the third communication interface may be an SP interface, and a network architecture in the exemplary embodiment is shown in FIG. 3c.

In an exemplary embodiment, the PMS 22 is in a wired connection or a wireless connection with the PSS 26. In an exemplary embodiment, when the PMS 22 is in the wireless connection with the PSS 26, the PSS 26 has a visual path with at least one PSS managed by the PMS 22.

In an exemplary embodiment, the in-band positioning signal includes, but not limited to a positioning pilot signal, or another signal used for implementing positioning.

In an exemplary embodiment, the positioning pilot signal is determined in one of the following manners. A first manner in which a positioning pilot signal sequence of the PSS in LTE is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

and $$c_{init} = 2^{10} \cdot (7 \cdot (n_s + 1) + l + 1) \cdot (2 \cdot N_{ID}^{cell} + 1 + k \cdot PSSID) + 2 \cdot N_{ID}^{cell} + k \cdot PSSID + N_{CP},$$

where $N_{ID}^{cell}$ is a cell ID of the PMS; PSSID is a PSS ID; k is a natural number arranged by the system; $n_S$ is a timeslot number; l is a symbol number of OFDM in a timeslot; $N_{RB}^{max,DL}$ is equal to an allocated resource length; m is a variable; c(i) is a pseudo-random sequence; $c_{init}$ is an initial value of a function c(x), and $N_{CP}$ is:

$$N_{CP} = \begin{cases} 1 & \text{normal } CP \\ 0 & \text{extended } CP \end{cases};$$

and a second manner in which when one or more cells correspond to the one or more PSSs one to one and a specified device in the one or more cells is determined as a PSS, the positioning pilot signal sequence is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

and $$c_{init} = 2^{10} \cdot (7 \cdot (n_s + 1) + l + 1) \cdot (2 \cdot CELLID + 1) + 2 \cdot CELLID + N_{CP},$$

where CELLID is a cell ID; $n_S$ is a timeslot number; l is a symbol number of OFDM in a timeslot; $N_{RB}^{max,DL}$ is equal to an allocated resource length; m is a variable; c(i) is a pseudo-random sequence, and is initialized to be $c_{init}$; and $N_{CP}$ is:

$$N_{CP} = \begin{cases} 1 & \text{normal } CP \\ 0 & \text{extended } CP \end{cases}.$$

In an exemplary embodiment, a length of the in-band positioning signal matches a resource length in the positioning signal auxiliary information; and/or, different in-band positioning signals meet orthogonality with each other; and/or, time of a positioning signal meets orthogonality after shifted by an integral multiple of a standard sampling point period, wherein the standard sampling point period is a time interval between sampling points corresponding to a sampling frequency meeting baseband signal processing.

The PSS 26 regulates the sending clock of the in-band positioning signal in one of the following manners. In one manner, the local sending clock is regulated to make a clock pulse time point of the local sending clock consistent with the synchronization reference clock; in another manner, a sending time point of the in-band positioning signal is regulated and the difference value is added to the local clock pulse time point to obtain a time point as the sending time point of the in-band positioning signal.

Figure 5:
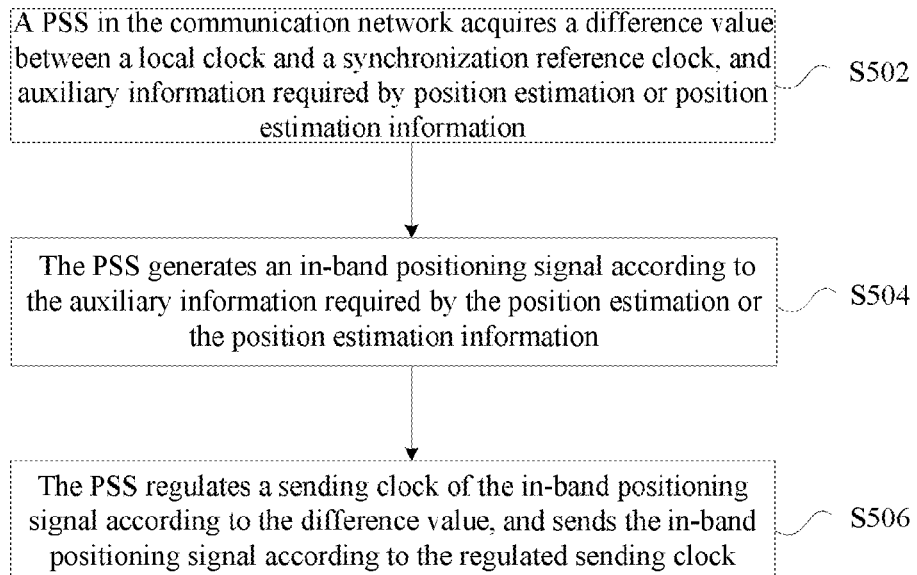
FIG. 5 is a flowchart of a method for sending an in-band positioning signal in a communication network according to an embodiment of the present disclosure.

The embodiments provide a method for sending an in-band positioning signal in a communication network. FIG. 5 is a flowchart of a method for sending an in-band positioning signal in a communication network according to an embodiment of the present disclosure. As shown in FIG. 5, the flow includes the following acts.

At act S502, a PSS in the communication network acquires a difference value between a local clock and a synchronization reference clock, and auxiliary information required by position estimation or position estimation information.

At act S504, the PSS generates an in-band positioning signal according to the auxiliary information required by the position estimation or the position estimation information.

At act S506, the PSS regulates a sending clock of the in-band positioning signal according to the difference value, and sends the in-band positioning signal according to the regulated sending clock.

By the acts above, a contradiction between positioning accuracy and costs in the current communication network is solved, meanwhile, a high-accuracy clock synchronization mechanism is provided, and the conventional problems of low positioning accuracy and high arrangement costs in the communication network are solved, thereby achieving the effects of improving the positioning accuracy of the communication network with low cost and seamlessly integrating the communication network and positioning.

In an exemplary embodiment, a length of the in-band positioning signal matches a resource length in positioning signal auxiliary information; and/or, different in-band positioning signals meet orthogonality with each other; and/or, time of a positioning signal meets orthogonality after shifted by an integral multiple of a standard sampling point period.

In another exemplary embodiment, the standard sampling point period is a time interval between sampling points corresponding to a sampling frequency meeting baseband signal processing.

The PSS may regulate the sending clock of the in-band positioning signal in one of the following manners. In one manner, a local sending clock is regulated to make a clock pulse time point of the local sending clock consistent with the synchronization reference clock; in another manner, a sending time point of the in-band positioning signal is regulated and the difference value is added to the local clock pulse time point to obtain a time point as the sending time point of the in-band positioning signal.

For the abovementioned problems existing in the related art, descriptions will be made below with reference to an exemplary embodiment, and the exemplary embodiment combines the abovementioned embodiments and exemplary implementation modes thereof.

In an exemplary embodiment, an eNodeB (the eNodeB and a PMS are located in the same device) and an in-band PSS are located in the same device.

In the embodiment, the eNodeB and the PMS are located in the same device, and in the descriptions made in the embodiment, an eNodeB represents the device where the eNodeB and the PMS are located.

Figure 6:
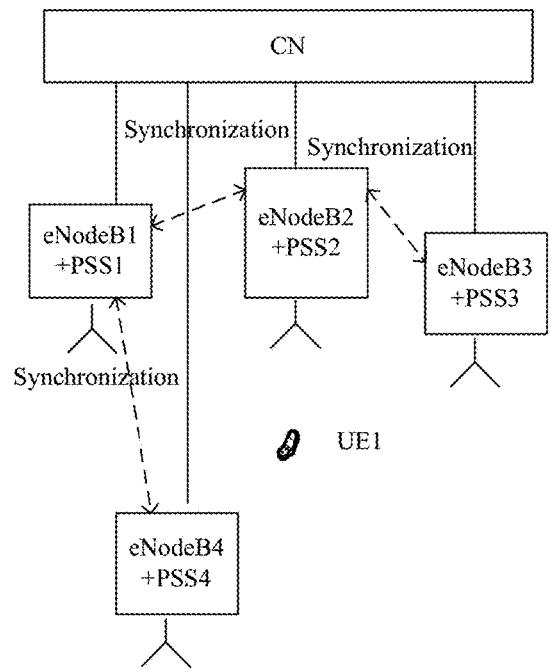
FIG. 6 is a structure diagram of a device where both an eNodeB and a PSS are located according to an embodiment of the present disclosure.

As shown in FIG. 6, in a wireless network, there are four eNodeBs, i.e. an eNodeB1, an eNodeB2, an eNodeB3 and an eNodeB4, and 4 PSSs, i.e. a PSS1, a PSS2, a PSS3 and a PSS4.

In the network, the eNodeBs correspond to the PSSs one to one and the eNodeB and the PSS are integrated in the same device.

The devices of which each integrates the eNodeB and the PSS are kept synchronized through the eNodeBs, and a synchronization method between the eNodeBs is not described in the embodiment.

Descriptions will be made below with the PSS1 and the eNodeB1 as an exemplary example.

Since the PSS1 and the eNodeB1 are located in the same device, the eNodeB1 may directly read an equipment number of the PSS1 and inquire a configuration table to obtain a CELLid1, a PSSid1 and positioning signal auxiliary information.

Since located in the same device, the PSS1 and the eNodeB1 use the same sending component, so the PSS1 and the eNodeB1 are naturally synchronized.

The PSS1 generates a synchronization signal sequence through the CELLid1, the PSSid1 and the positioning signal auxiliary information, and combines the synchronization signal sequence with a communication signal of the eNodeB1 for sending.

A processing process of the PSS2 and the eNodeB2, the PSS3 and the eNodeB3 and the PSS4 and the eNodeB4 is similar to a processing process of the PSS1 and the eNodeB1.

User Equipment 1 (UE1) measures positioning signals sent by the PSS1, the PSS2, the PSS3 and the PSS4, and then performs positioning.

In another exemplary embodiment, the eNodeB and the PSS are mutually independent and form a heterogeneous network structure.

Figure 7:
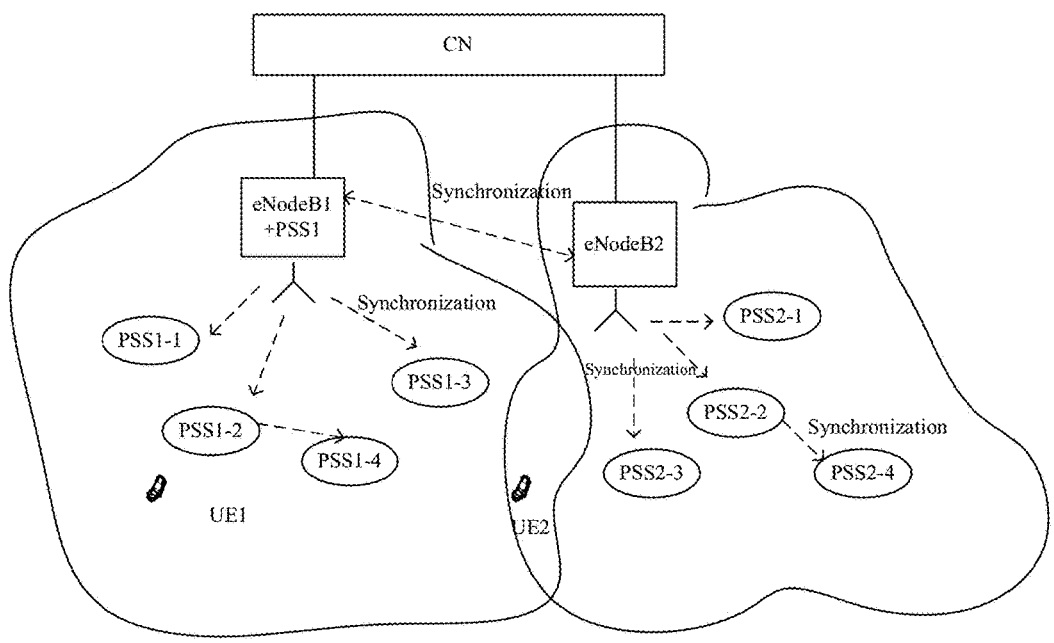
FIG. 7 is a structure diagram of a heterogeneous network where eNodeBs and PSSs are independent according to an embodiment of the present disclosure.

As shown in FIG. 7, in a wireless network, there are two eNodeBs, i.e. an eNodeB1 and an eNodeB2. The eNodeB1 manages 4 PSSs, i.e. a PSS1-1, a PSS1-2, a PSS1-3 and a PSS1-4. The eNodeB2 manages 4 PSSs, i.e. a PSS2-1, a PSS2-2, a PSS2-3 and a PSS2-4.

The eNodeB1 and the PSS1-1 are located in the same device, and the processing method of the abovementioned exemplary embodiment may be adopted.

The processing method will be described with the PSS1-4 and the eNodeB1 as an example.

The PSS1-4 reports its own equipment number to the eNodeB1, and the eNodeB1 inquires configuration data to obtain a CELLid1, a PSS1-4id, positioning signal auxiliary data and synchronization auxiliary data.

When an auxiliary site included by the synchronization auxiliary data is the PSS1-2, and then the PSS1-4 obtains a clock difference between a local clock and the eNodeB1 from the PSS1-2 after cooperating with the PSS1-2.

The PSS1-4 generates a synchronization signal sequence through the CELLid1, the PSS1-4id and the positioning signal auxiliary information, and combines the synchronization signal sequence with a communication signal of the eNodeB1 for sending.

For an LTE system, the synchronization signal sequence is generated according to the following method:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

and $$c_{init} = 2^{10} \cdot (7 \cdot (n_s + 1) + l + 1) \cdot (2 \cdot N_{ID}^{cell} + 1 + k \cdot PSSid) +$$
$$2 \cdot N_{ID}^{cell} + k \cdot PSSid + N_{CP},$$

where k is configured by the system, and may be a numerical value such as 512, $n_S$ is a timeslot number; 1 is a symbol number of OFDM in a timeslot; and $N_{RB}^{max,DL}$ is equal to a parameter such as an allocated resource length and may be selected to be obtained from the positioning signal auxiliary information. These parameters may be specified when the system is designed, and both a signal sender and a signal receiver perform processing according to a specified signal generation method.

Processing for the PSS1-1, the PSS1-2 and the PSS1-3 is similar to processing for the PSS1-4; positioning signal auxiliary information and synchronization auxiliary data are obtained from the eNodeB1, and a synchronization clock difference is directly obtained from the eNodeB1.

Processing of the PSS2-4 is similar to processing of the PSS1-4; positioning signal auxiliary data and synchronization auxiliary data are obtained from the eNodeB1, and a synchronization clock difference is obtained from the PSS2-2 after cooperating with the PSS2-2.

Processing of the PSS2-1, the PSS2-2 and the PSS2-3 is similar to processing of the PSS1-4; positioning signal auxiliary information and synchronization auxiliary data are obtained from the eNodeB2, and a synchronization clock difference is directly obtained from the eNodeB2.

Each PSS generates a positioning signal, regulates a signal sending time point according to the synchronization clock difference, and sends a synchronization signal.

Detailed descriptions will be made below according to different performance states of an eNodeB, a PSS and a PMS.

In another exemplary embodiment, wireless management is adopted for the eNodeB and the PSS.

In the embodiment, the eNodeB and the PMS are located in the same device, and in the descriptions made in the embodiment, an eNodeB is used for representing the device where the eNodeB and the PMS are located.

Figure 8:
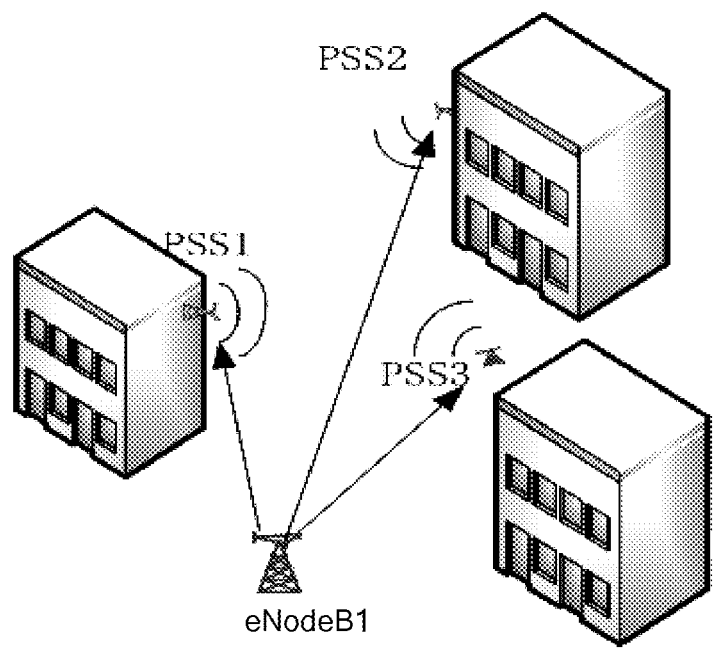
FIG. 8 is a wireless networking diagram of an eNodeB and PSSs according to an embodiment of the present disclosure.

FIG. 8 is a wireless networking diagram of an eNodeB and PSSs according to an embodiment of the present disclosure. As shown in FIG. 8, in a wireless network, there is one eNodeB, i.e. an eNodeB1. The eNodeB1 manages three PSSs, i.e. a PSS1, a PSS2 and a PSS3. The three PSSs are independent from the eNodeB1.

The PSS1 is taken as an example.

After obtaining an equipment number of the PSS1, a management component of the PSS1 sends the equipment number of the PSS1 to the eNodeB1 through a communication component of the PSS1.

The eNodeB1 sends auxiliary information to the PSS1 after receiving the equipment number of the PSS1.

After receiving the auxiliary information, the communication component of the PSS1 sends the auxiliary information to the management component of the PSS1.

The management component notifies a synchronization component of the PSS1 of initiating synchronization according to the auxiliary information.

The synchronization component of the PSS1 cooperates with an auxiliary site in the auxiliary information, and obtains a clock difference between the PSS1 and a reference clock of the eNodeB1. A wireless synchronization cooperation process will not be described in the present patent.

A sending component of the PSS1 generates a positioning signal of the PSS1 according to positioning signal auxiliary information and the clock difference, and after regulating a sending time, the sending component of the PSS1 sends the positioning signal.

In an exemplary embodiment, wired management is adopted for an eNodeB and a PSS.

Figure 9:
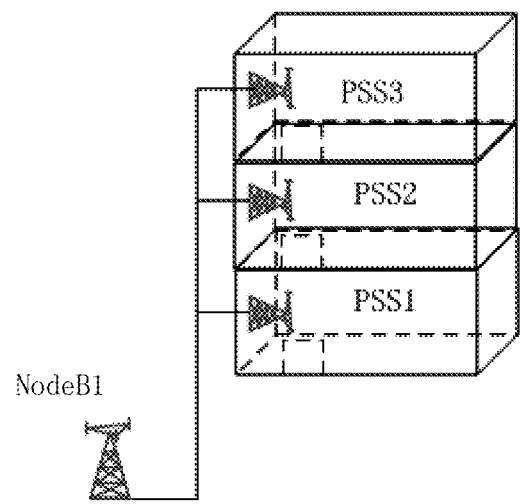
FIG. 9 is a wired networking diagram of an eNodeB and PSSs according to an embodiment of the present disclosure.

FIG. 9 is a wired networking diagram of an eNodeB and PSSs according to an embodiment of the present disclosure. As shown in FIG. 9, in a wireless network, there is one eNodeB, i.e. an eNodeB1. The eNodeB1 manages three PSSs, i.e. a PSS1, a PSS2 and a PSS3. The three PSSs are independent from the eNodeB1.

The PSS1 is taken as an example.

After obtaining an equipment number of the PSS1, a management component of the PSS1 sends the equipment number of the PSS1 to the eNodeB1 through a communication component of the PSS1.

The eNodeB1 sends auxiliary information to the PSS1 after receiving the equipment number of the PSS1.

After receiving the auxiliary information, the communication component of the PSS1 sends the auxiliary information to the management component of the PSS1.

The management component notifies a synchronization component of the PSS1 of initiating synchronization according to the auxiliary information.

The synchronization component of the PSS1 cooperates with an auxiliary site in the auxiliary information, and obtains a clock difference between the PSS1 and a reference clock of the eNodeB1. A wired synchronization cooperation process will not be described in the present patent.

A sending component of the PSS1 generates a positioning signal of the PSS1 according to positioning signal auxiliary information and the clock difference, and after regulating a sending time, the sending component of the PSS1 sends the positioning signal.

In an exemplary embodiment, an eNodeB and an PMS are independent devices.

Figure 10:
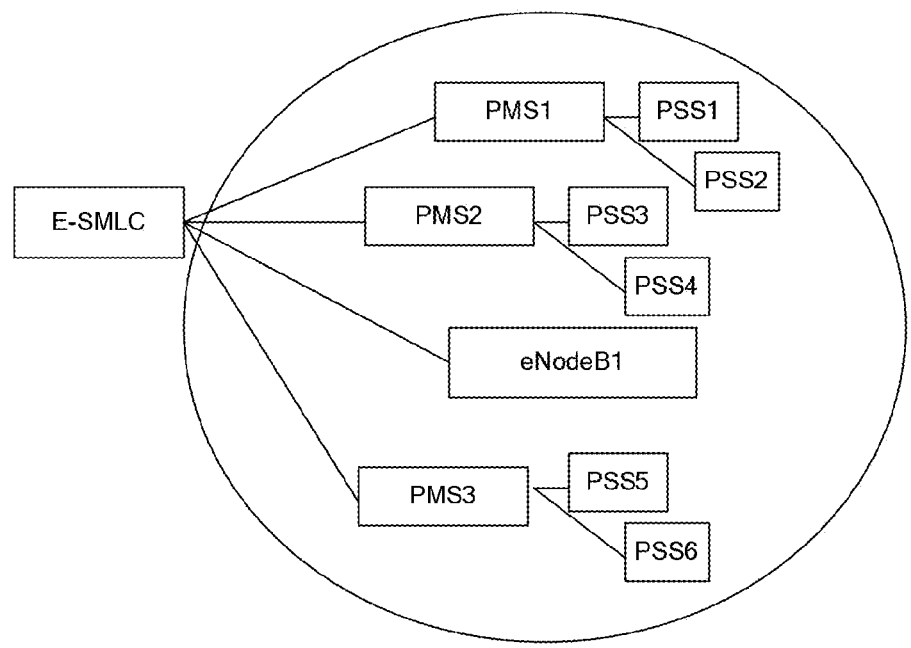
FIG. 10 is a schematic diagram when an eNodeB and PMSs are mutually independent according to an embodiment of the present disclosure.

FIG. 10 is a schematic diagram when an eNodeB and PMSs are mutually independent according to an embodiment of the present disclosure. As shown in FIG. 10, in a wireless network, there is one eNodeB and three wireless PMSs, i.e. an eNodeB1, a PMS1, a PMS2 and a PMS3, wherein the PMS1 manages two PSSs, i.e. a PSS1 and a PSS2; the PMS2 manages two PSSs, i.e. a PSS3 and a PSS4; and the PMS3 manages two PSSs, i.e. a PSS5 and a PSS6.

In the embodiment, it can be seen that the eNodeB and the PMSs are mutually independent, and the PMSs are independently connected with an E-SMLS network element.

A process for managing each PSS is similar to processes in embodiment 1 and embodiment 2.

In an exemplary embodiment, an eNodeB and a PMS are located in the same device.

As shown in FIG. 10, in a wireless network, there are three eNodeBs and three wireless PMSs, i.e. an eNodeB1, an eNodeB2, an eNodeB3, a PMS1, a PMS2 and a PMS3, wherein the PMS1 manages two PSSs, i.e. a PSS1 and a PSS2; the PMS2 manages two PSSs, i.e. a PSS3 and a PSS4; and the PMS3 manages two PSSs, i.e. a PSS5 and a PSS6.

Figure 11:
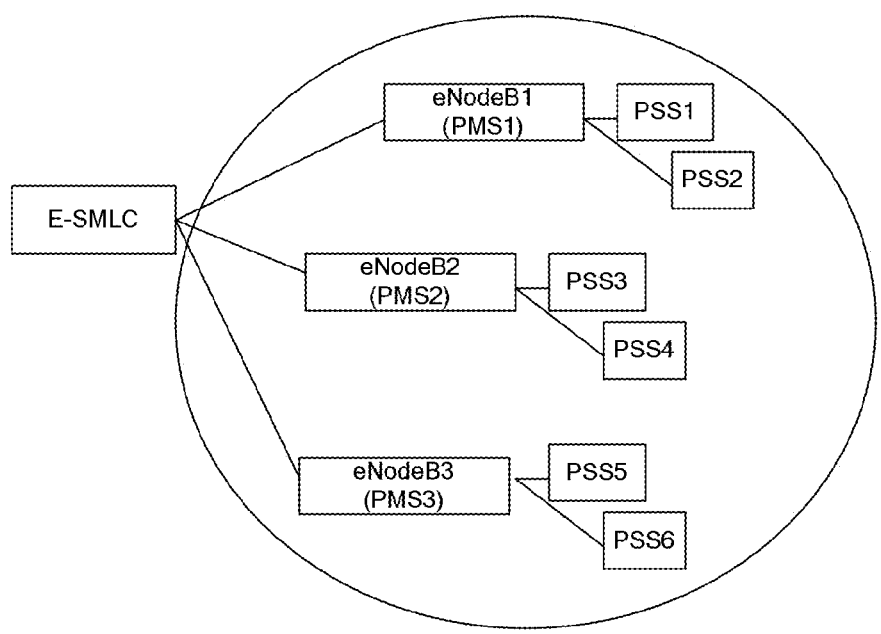
FIG. 11 is a schematic diagram of a device where both an eNodeB and a PMS are located according to an embodiment of the present disclosure.

As shown in FIG. 11, in the embodiment, it can be seen that the eNodeB1 and the PMS1 are located in the same device; the eNodeB2 and the PMS2 are located in the same device; and the eNodeB3 and the PMS3 are located in the same device.

The devices where the eNodeBs and the PMSs simultaneously implement an s1 interface between the eNodeBs and a Mobile Management Entity (MME) and an SP interface between the PMSs and an E-SMLC.

A process for managing each PSS is similar to processes in the abovementioned alternative embodiments.

It is important to note that "first", "second", "third" and "fourth" involved in the embodiments of the present disclosure are only adopted for distinguishing and not intended to form limits to sequences.

Compared with the prior art, the embodiments of the present disclosure have the following advantages:

1. a positioning network is implemented in a current communication network;

2. coverage of the communication network and the positioning network may be completely consistent, may also be partially overlapped, or may further be mutually independent;

3. wireless positioning accuracy of the current communication network is improved, meanwhile, an increase of a communication network density is avoided, and an increase of signal interference is avoided; and 4. since the PSS only sends the positioning signal, an equipment structure and process for processing a signal may be very simple, and operation costs may also be greatly reduced, for example, electricity consumption is remarkably reduced.

In another embodiment, software is further provided, which is configured to execute the technical solutions described in the abovementioned embodiments and exemplary implementation modes.

In another embodiment, a storage medium is further provided, in which the abovementioned software is stored, and the storage medium includes, but not limited to: an optical disk, a floppy disk, a hard disk, an erasable memory and the like.

Obviously, those skilled in the art shall understand that the above-mentioned components or steps of the disclosure can be realized by using general purpose calculating device, can be integrated in one calculating device or distributed on a network which consists of a plurality of calculating devices. Alternatively, the components or the steps of the disclosure can be realized by using the executable program code of the calculating device. Consequently, they can be stored in the storing device and executed by the calculating device, and under some circumstances, the shown or described steps can be executed in different orders, or they are made into integrated circuit component respectively, or a plurality of components or steps thereof are made into one integrated circuit component. In this way, the disclosure is not restricted to any particular hardware and software combination.

The descriptions above are only the example embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

INDUSTRIAL APPLICABILITY

On the basis of the technical solutions provided by the embodiments of the present disclosure, a PMS is located in the communication network and is arranged to manage one or more PSSs and provide a synchronization reference clock for the one or more PSSs; a positioning center network element is located in the communication network and arranged to provide position estimation information for a terminal based on position information of the one or more PSSs and send the position estimation information to the terminal; and the one or more PSSs, of which each PSS uses a same frequency band used by the communication network and is arranged to generate, according to positioning signal auxiliary information, an in-band positioning signal for measuring a distance, regulate a sending clock of the in-band positioning signal according to a difference value between a local sending clock and the synchronization reference clock provided by the PMS and send the in-band positioning signal to the terminal according to the regulated sending clock. A contradiction between positioning accuracy and costs in the current communication network is solved, meanwhile, a high-accuracy clock synchronization mechanism is provided, and the conventional problems of low positioning accuracy and high arrangement costs in the communication network are solved, thereby achieving the effects of improving the positioning accuracy of the communication network with low cost and seamlessly integrating the communication network and positioning.

What is claimed is:

1. An in-band positioning system in a communication network, comprising:
    a Position Management Station (PMS), located in the communication network arranged to manage one or more Position Service Stations (PSSs) and provide a synchronization reference clock for the one or more PSS s;
    a positioning center network element, located in the communication network and arranged to provide position estimation information for a terminal based on position information of the one or more PSSs and send the position estimation information to the terminal; and
    the one or more PSSs, of which each PSS uses a same frequency band used by the communication network and is arranged to generate, according to positioning signal auxiliary information, an in-band positioning signal for measuring a distance, regulate a sending clock of the in-band positioning signal according to a difference value between a local sending clock and the synchronization reference clock provided by the PMS and send the in-band positioning signal to the terminal according to the regulated sending clock.

2. The system as claimed in claim 1, wherein the PMS and the PSS are deployed in the communication network in one of the following forms:
    a first form in which the PMS and the PSS are located in a same device;
    a second form in which the PMS and the PSS are two separate and independent devices; and
    a third form in which the first form and the second form coexist.

3. The system as claimed in claim 2, wherein the PSS sends the in-band positioning signal in one of the following manners:
    when the PSS and the PMS are located in the same device, sending, by the PSS, a communication signal and the in-band positioning signal together through a resource used for the communication signal of the PMS;
    when the PSS and the PMS are two separate and independent devices, sending, by the PSS, the in-band positioning signal and a specified wireless signal together; and
    sending, by the PSS, the in-band positioning signal only.

4. The system as claimed in claim 1, wherein
    the PMS is located in an evolved Node B (eNodeB), or the PMS and an eNodeB are separately arranged; and/or
    in a Long-Term Evolution (LTE) system, the positioning center network element is an Evolved Serving Mobile Location Center (E-SMLC).

5. The system as claimed in claim 1, wherein the PSS comprises:
    a storage, arranged to store an equipment number of the PSS, wherein an equipment number of each PSS is unique;
    a hardware processor, arranged to acquire, from the PMS, a cell Identifier (ID) or a PSS ID used for uniquely identifying the PSS, and acquire synchronization auxiliary information and the positioning signal auxiliary information; measure a clock difference between a local clock and a reference node; and regulate the local sending clock according to the cell ID of the PMS or the PSS ID, and the clock difference, and generate the in-band positioning signal;

a transmitter, arranged to implement communication between the PSS and other equipment excluding the PSS, and send the in-band positioning signal to the terminal.

6. The system as claimed in claim 5, wherein the hardware processor is arranged to acquire the cell ID or the PSS ID in one of the following manners:
   arranging the hardware processor to, when the PMS manages multiple PSSs and the PSS ID is not a globally uniformly allocated ID, report the equipment number of the PSS to the PMS through the transmitter, and the PMS locally acquiring the PSS ID and the cell ID of the PMS according to the equipment number; and
   arranging the hardware processor to, when the one or more PSSs correspond to one or more cells one to one, or the PSS and the PMS are located in the same device, report the equipment number of the PSS through the transmitter, and the PMS acquiring a cell ID of a cell where the PMS is located according to the equipment number.

7. The system as claimed in claim 6, wherein when the PMS is located in an evolved Node B (eNodeB), the cell ID of the PMS is a cell ID of the eNodeB; or when the PMS and the eNodeB are separately arranged, a cell ID is allocated to the PMS.

8. The system as claimed in claim 5, wherein
   the positioning signal auxiliary information comprises at least one of: a frequency-domain resource position of a positioning signal, time-domain resource position of a positioning signal, and length of a positioning signal;
   the hardware processor is arranged to acquire the positioning signal auxiliary information in one of the following manners: acquiring the positioning signal auxiliary information from the PMS; and acquiring the positioning signal auxiliary information from preset configuration information;
   the synchronization auxiliary information comprises one of: a sending time point of measurement information of the clock difference and address information of an auxiliary site, wherein the auxiliary site is a node on a visual path tree between the PSS and the PMS;
   the PSS ID is acquired in one of the following manners: allocating the equipment number to the PSS, wherein equipment numbers allocated to each PSS are different, and determining the allocated equipment number as the PSS ID; defining an identification number used for uniquely identifying the PSS by adopting a preset format, and determining the identification number as the PSS ID; and/or
   the hardware processor acquires the clock difference in the following manner: performing, by the hardware processor, synchronization message interaction with an auxiliary site to acquire the clock difference according to the synchronization auxiliary information.

9. The system as claimed in claim 1, wherein
   the PSS sends the in-band positioning signal to the terminal through a first communication interface, wherein the first communication interface is a dedicated interface for sending the in-band positioning signal; and/or
   the PMS communicates with the PSS through a second communication interface, wherein the second communication interface is a dedicated interface for managing the PSS by the PMS and providing synchronization information and the positioning signal auxiliary information for the PSS; and/or
   the PMS communicates with the positioning center network element through a third communication interface, wherein the third communication interface is a dedicated interface for transmitting auxiliary information required by position estimation or the position estimation information.

10. The system as claimed in claim 1, wherein the PMS is in a wired connection or a wireless connection with the PSS.

11. The system as claimed in claim 1, wherein when the PMS is in the wireless connection with the PSS, the PSS has a visual path with at least one PSS managed by the PMS.

12. The system as claimed in claim 11, wherein the in-band positioning signal comprises: a positioning pilot signal.

13. The system as claimed in claim 12, wherein the positioning pilot signal is determined in one of the following manners:
   a first manner in which a positioning pilot signal sequence of the PSS in LTE is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

and $$c_{init} = 2^{10} \cdot (7 \cdot (n_s + 1) + l + 1) \cdot (2 \cdot N_{ID}^{cell} + 1 + k \cdot PSSID) +$$
$$2 \cdot N_{ID}^{cell} + k \cdot PSSID + N_{CP},$$

where $N_{ID}^{cell}$ is a cell Identifier (ID) of the PMS; PSSID is a PSS ID; k is a natural number arranged by the system; $n_S$ is a timeslot number; l is symbol number of Orthogonal Frequency Division Multiplexing (OFDM) in a timeslot;
$N_{RB}^{max,DL}$ is equal to an allocated resource length m is a variable; c(i) is a pseudo-random sequence; $c_{init}$ is an initial value of a function c(x), and $N_{CP}$ is:

$$N_{CP} = \begin{cases} 1 & \text{normal } CP \\ 0 & \text{extended } CP \end{cases};$$

a send manner in which, when one or more cells correspond to the one or more PSSs one to one and a specified device in the one or more cells is determined as a PSS,
the positioning pilot signal sequence is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

and $$c_{init} = 2^{10} \cdot (7 \cdot (n_s + 1) + l + 1) \cdot (2 \cdot CELLID + 1) + 2 \cdot CELLID + N_{CP},$$

where CELLID is a cell ID; $n_S$ is a timeslot number, l is a symbol number of OFDM in a timeslot; $N_{RB}^{max,DL}$ is equal to an allocated resource length; m is a variable; c(i) is a pseudo-random sequence, and is initialized to be $c_{init}$; and $N_{CP}$ is:

$$N_{CP} = \begin{cases} 1 & \text{normal } CP \\ 0 & \text{extended } CP \end{cases}.$$

14. The system as claimed in claim 1, wherein a length of the in-band positioning signal matches a resource length in the positioning signal auxiliary information; and/or, different in-band positioning signals meet orthogonality with each other; and/or, time of a positioning signal meets orthogonality after shifted by an integral multiple of a standard sampling point period.

15. The system as claimed in claim 1, wherein the standard sampling point period is a time interval between sampling points corresponding to a sampling frequency meeting baseband signal processing.

16. The system as claimed in claim 1, wherein the PSS regulates the sending clock of the in-band positioning signal in one of the following manners:
   regulating the local sending clock to make a clock pulse time point of the local sending clock consistent with the synchronization reference clock; and
   regulating a sending time point of the in-band positioning signal and adding the difference value to a clock pulse time point of the local sending clock to obtain a time point as the sending time point of the in-band positioning signal.

17. A method for sending an in-band positioning signal in a communication network, comprising:
   acquiring, by a Position Service Station (PSS) in the communication network, a difference value between a local sending clock and a synchronization reference clock, and auxiliary information required by position estimation or position estimation information;
   generating, by the PSS, an in-band positioning signal according to the auxiliary information required by the position estimation or the position estimation information; and
   regulating, by the PSS, a sending clock of the in-band positioning signal according to the difference value, and sending, by the PSS, the in-band positioning signal according to the regulated sending clock.

18. The method as claimed in claim 17, wherein a length of the in-band positioning signal matches a resource length in positioning signal auxiliary information; and/or, different in-band positioning signals meet orthogonality with each other; and/or, time of a positioning signal meets orthogonality after shifted by an integral multiple of a standard sampling point period.

19. The method as claimed in claim 17, wherein the standard sampling point period is a time interval between sampling points corresponding to a sampling frequency meeting baseband signal processing.

20. The method as claimed in claim 17, wherein the PSS regulates the sending clock of the in-band positioning signal in one of the following manners:
   regulating the local sending clock to make a clock pulse time point of the local sending clock consistent with the synchronization reference clock; and
   regulating a sending time point of the in-band positioning signal and adding the difference value to a local clock pulse time point to obtain a time point as the sending time point of the in-band positioning signal.

* * * * *